United States Patent
Asakura (10) Patent No.: US 6,441,557 B1
(45) Date of Patent: Aug. 27, 2002

(54) AUTO LIGHT-CONTROL SYSTEM

(75) Inventor: Toshiyuki Asakura, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/514,315

(22) Filed: Feb. 28, 2000

(30) Foreign Application Priority Data

Feb. 26, 1999 (JP) ............................................ 11-049524
Jan. 26, 2000 (JP) ....................................... 2000-017001

(51) Int. Cl.$^7$ ............................................ H05B 37/02
(52) U.S. Cl. ...................... 315/149; 315/158; 315/159
(58) Field of Search ............................... 315/149, 156, 315/158, 157, 159

(56) References Cited

U.S. PATENT DOCUMENTS 5,012,392 A * 4/1991 Hochstein ....................... 362/4
5,361,008 A    11/1994 Saijo

FOREIGN PATENT DOCUMENTS

| JP | 1-227520 | 9/1989 |
|----|----------|--------|
| JP | 2-266836 | 10/1990 |
| JP | 3-262209 | 11/1991 |
| JP | 4-134271 | 5/1992 |
| JP | 5-52880 | 2/1993 |
| JP | 6-244414 | 2/1994 |
| JP | 6-244693 | 2/1994 |
| JP | 6-27157 | 4/1994 |
| JP | 6-61432 | 4/1994 |
| JP | 6-188704 | 8/1994 |
| JP | 9-145749 | 6/1997 |

* cited by examiner

*Primary Examiner*—Don Wong
*Assistant Examiner*—David H Vu
(74) *Attorney, Agent, or Firm*—Sughrue Mion, PLLC (57) ABSTRACT

Using a simple circuit arrangement, a brightness of the lamp is controlled in accordance with an ambient brightness. A light sensor (10) produces an analog signal of which the signal level depends on an ambient brightness. An A/D converting circuit (307) converts the analog signal into a digital signal of which the pulse width depends on the signal level of the analog signal. An FET QA is on/off controlled in accordance with the digital signal (PWM), and hence an average value of current flowing through a head light (L1) is controlled in level. As a result, a brightness of the head light (L1) is controlled in accordance with the ambient brightness.

2 Claims, 5 Drawing Sheets

FIG. 6

AUTO LIGHT-CONTROL SYSTEM

BACKGROUND OF THE INVENTION

1. Field of the Invention

The present invention relates to an auto light-control system. More particularly, the present invention relates to an auto light-control system which is suitable for the control of a brightness of a lighting device, such as a head light, in accordance with an ambient brightness.

The present application is based on Japanese Patent Applications Nos. Hei. 11-49524 and 2000-17001, which are incorporated herein by reference.

2. Description of the Related Art

Figure 5:
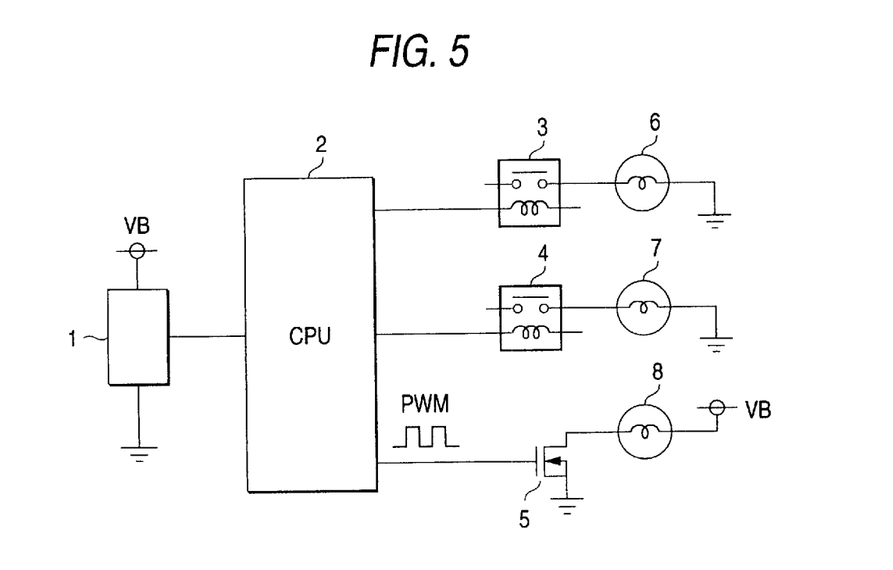
FIG. 5 is a circuit diagram showing a related auto light-control system which forms an embodiment of the present invention.

An auto light-control system shown in FIG. 5 has been known. The auto light-control system includes a light sensor 1, a CPU (microprocessor) 2, relays 3 and 4, FET 5, a clear lamp (tail lamp) 6, a head lamp (head light) 7, and a head lamp 8.

Figure 6:
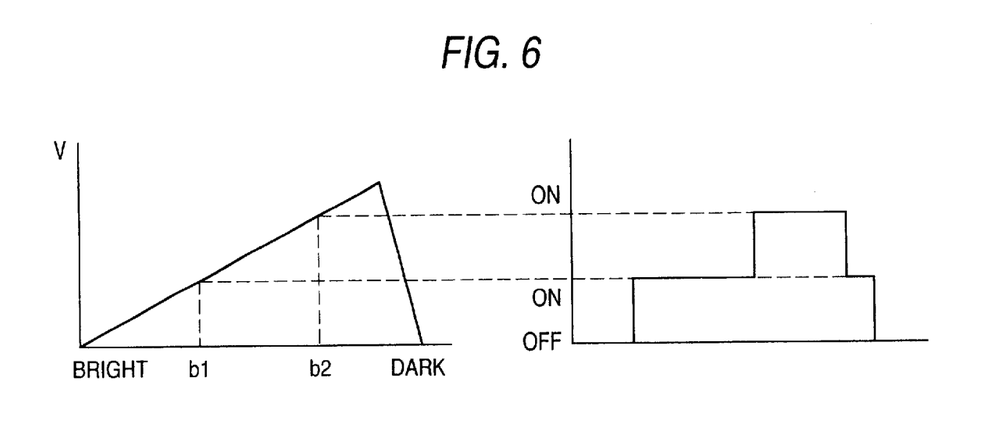
FIG. 6 is a graph showing a relationship between a light sensor and lighting states of the lamp.

The light sensor 1, as shown in FIG. 6, is designed such that it senses an ambient brightness and produces an analog signal having a signal level which corresponds to the ambient brightness. The CPU 2 converts an analog signal received from the light sensor 1 into a digital signal, and compares a detection level of the light sensor 1 with a preset level. When as the result of the comparison, the detection level exceeds a preset level, the CPU 2 drives the relay 3 to turn on the clear lamp 6. When the detection level of the light sensor 1 exceeds another preset level b2, the CPU 2 drive the relay 4 to turn on the head lamp 7. At the same time, the CPU 2 applies a PWM signal to the FET 5 to turn on the FET 5, whereby the head lamp 8 is continuously turned on.

Thus, the auto light-control system uses the relay-basis control for the turning-on of the clear lamp 6 and the head lamp 7 and the semiconductor-basis control for the turning-on of the head lamp 8.

In the related auto light-control system, the control system including the CPU 2, for example, is indispensably used for the brightness control of the clear lamp 6 and the head lamps 7 and 8. For this reason, it is difficult to simplify the circuit arrangement.

SUMMARY OF THE INVENTION

An object of the present invention is to provide an auto light-control system which can control a brightness of the lamp as a load in accordance with an ambient brightness by use of a simple circuit arrangement.

To achieve the above object, according to the first aspect of the present invention, there is provided an auto light-control system which comprises a light sensor which senses an ambient brightness, and produces an analog signal representative of the ambient brightness, an analog-to-digital converting device which converts the analog signal output from the light sensor into a digital signal with a pulse width corresponding to a signal level of the analog signal, and outputs the digital signal as a drive signal, and a first switching device which is inserted in a power supply circuit connecting a load and a power supply, and which is adapted to conduct in response to the drive signal to close the power source circuit. In the auto light-control system, an output signal of the light sensor is applied through the analog-to-digital converting device to the first switching device, whereby the first switching device is always on/off controlled. Therefore, a brightness of the light as the load is controlled in accordance with an ambient brightness.

Accordingly, a brightness of the load, e.g., the lighting device, can be controlled in accordance with an ambient brightness using a simple circuit arrangement, not using the CPU.

According to the second aspect of the present invention, it is preferable that the auto light-control system further comprises a reference resistor which receives a current from the power supply to generate a reference voltage, and a second switching device which is inserted in a shunt circuit connecting the power supply and the reference resistor, and which is adapted to conduct in response to the drive signal to close the shunt circuit. In accordance with this configuration, the drive of the first switching device can be controlled in a stable state.

According to the third aspect of the present invention, it is preferable that the auto light-control system further comprises a drive stopping device which stops the analog-to-digital converting device from outputting the drive signal when an output voltage of the first switching device is compared with the reference voltage and a difference between the output voltage and the reference voltage is out of a tolerance. Accordingly, since the drive stopping device stops the drive of the first switching device in an emergency, protection of the switching device is secured in an abnormal state, e.g., a load short-circuiting.

DETAILED DESCRIPTION OF THE PREFERRED EMBODIMENT

First, before giving a detailed description of the preferred embodiment of the present invention, a description will be given of a basic configuration of a switching device with a current-oscillating type circuit-breaking function and an outline of its basic operation with reference to FIGS. 1 to 3B.

Figure 1:
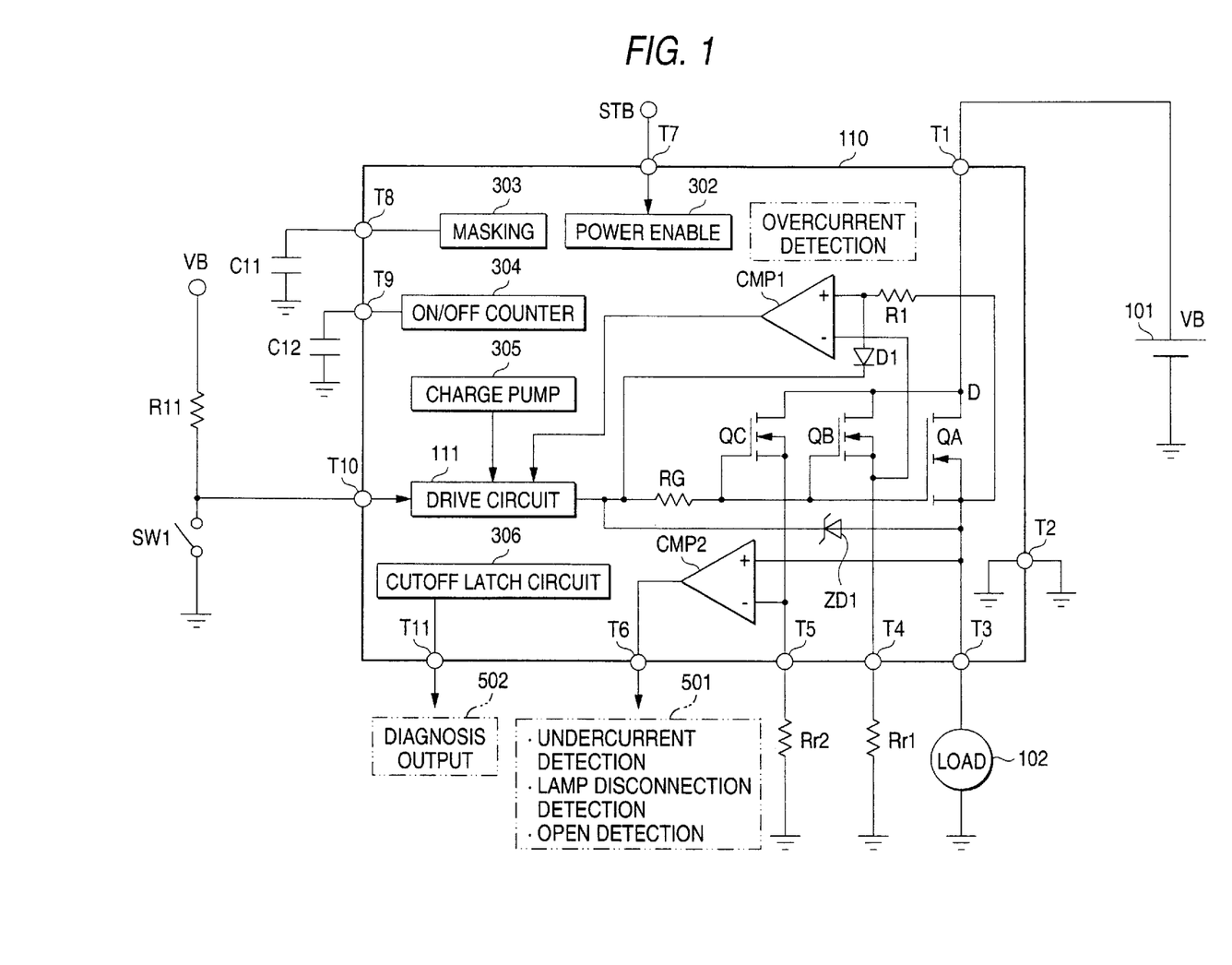
FIG. 1 is a block diagram showing a switching device with a current-oscillating type circuit-breaking function on which the present invention is based.

As shown in FIG. 1, the switching device with a current-oscillating type circuit-breaking function is configured as a semiconductor integrated circuit (power IC) in which various circuit elements are integrated on a semiconductor chip 110. A power supply terminal T1 is connected to a power supply 101 with an output voltage VB (e.g., +12 volts), a grounding terminal T2 is grounded, and output terminal T3 is connected to a load 102.

An n-channel FET QA with a built-in temperature sensor is integrated on the semiconductor chip 110 as a semiconductor device (power device) having a heat-sensitizing circuit-breaking function. The FET QA with a built-in temperature sensor has a drain electrode connected to the power supply 101 through a drain terminal D and the power supply terminal T1, a source electrode connected to the load 102 through the output terminal T3, and a gate electrode connected to a drive circuit 111 through a gate terminal TG and a resistor RG. The FET QA with a built-in temperature sensor serves as a first switching device which is inserted in a power supply circuit connecting the power supply 101 and the load 102 and conducts (switches on) in response to a drive signal (on-pulse signal) inputted to the gate terminal TG so as to close the power supply circuit. N-channel FETs QB and QC are integrated as reference devices in parallel with the FET QA with a built-in temperature sensor.

The FET QB has a drain electrode connected to the power supply 101 through the drain terminal D and the power supply terminal T1, a source electrode connected to a first reference resistor Rr1 through an output terminal T4, and a gate electrode connected to the resistor RG through the gate terminal TG. The FET QC has a drain electrode connected to the power supply 101 through the drain terminal D and the power supply terminal T1, a source electrode connected to a second reference resistor Rr2 through an output terminal T5, and a gate electrode connected to the resistor RG through the gate terminal TG. The FET QB serves as a second switching device which conducts in response to the drive signal (on-pulse signal) inputted to the gate terminal TG so as to close a shunt circuit connecting the power supply terminal T1 and the first reference resistor Rr1. The FET QC serves as a third switching device which conducts in response to the drive signal (on-pulse signal) inputted to the gate terminal TG so as to close a shunt circuit connecting the power supply terminal T1 and the second reference resistor Rr2.

As the FETs QA, QB, and QC, it is possible to use power MOSFETs of, for example, a double diffusion MOS (DMOS) structure, a V-grooved MOS (VMOS) structure, or a U-grooved MOS (UMOS) structure, or MOSFETs having similar structures, and it is also possible to use MOS-combining type devices such as ESTs and MOS-controlled thyristors (MCTS) or other insulated-gate type power devices such as insulated gate drive bipolar transistors (IGBTs). Further, junction type FETs, junction type SITs or SI thyristors may be used if those are operated in a state that its gates are always reverse biased. Furthermore, as the FETs QA, QB, and QC used for the power IC, either the n-channel type or the p-channel type may be used.

In addition, the FET QA with a built-in temperature sensor, FET QB, and FET QC are configured by using, for instance, power devices of the multi-channel structure in which a plurality of unit cells are connected in parallel, and the FETs are arranged adjacent to each other. The current capacities of the FETs QB and QC are set to be smaller than the current capacity of the FET QA. This setting is adjusted by the number of parallel-connected unit cells which make up the FETs QB and QC. For example, the configuration provided is such that the number of unit cells of the FET QA is 1,000 where the number of unit cells of the FET QB is 1, and the ratio between the channel widths W of the FET QB and the FET QA is set to be 1:1,000, for example.

Further, the source terminal S of the FET QA is connected to plus input terminals of a comparator CMP1 and a comparator CMP2, respectively; the source electrode of the FET QB is connected to a minus input terminal of the comparator CMP1; and the source electrode of the FET QC is connected to a minus input terminal of the comparator CMP2. An output terminal of the comparator CMP1 is connected to the drive circuit 111, and an output terminal of the comparator CMP2 is connected to an abnormality detecting unit 501 for effecting undercurrent detection, lamp disconnection detection, and open detection through an output terminal T6 of the semiconductor chip 110. Incidentally, the source terminal S of the FET QA is connected to the drive circuit 111 through a zener diode ZD1, and this zener diode is disposed so as to maintain the voltage between the gate terminal TG and the source terminal S of each of the FET QA, the FET QB, and the FET QC and to bypass an overvoltage when the overvoltage is applied to the gate terminal TG.

Meanwhile, a power enable portion 302, a masking circuit 303, an on/off counter circuit 304, a charge pump circuit 305, and a cutoff latch circuit 306 are integrated on other regions of the semiconductor chip 110. The power enable portion 302 is connected to a terminal T7, the masking circuit 303 is connected to a capacitor C11 through a terminal T8, the on/off counter circuit 304 is connected to a capacitor C12 through a terminal T9, the drive circuit 111 is connected to a switch SW1 and a resistor R11 through an input terminal T10; and the cutoff latch circuit 306 is connected to a diagnosis output unit 502 through an output terminal T11.

Figure 2:
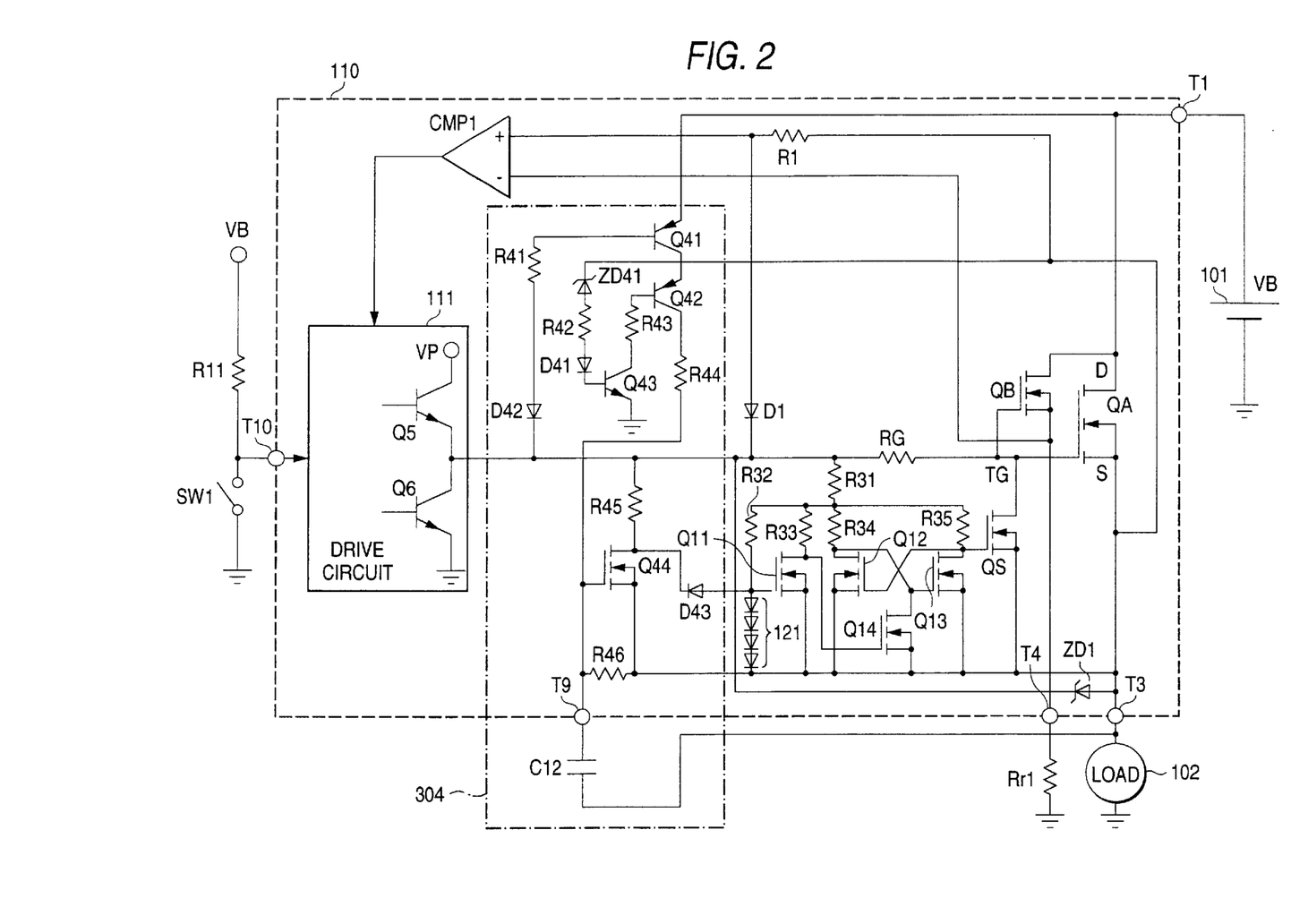
FIG. 2 is a circuit diagram showing a key portion of the switching device shown in FIG. 1.

As shown in FIG. 2, the drive circuit 111 has a source transistor Q5 and a synchronous transistor Q6, and also has semiconductor elements for controlling on-off operation of the respective transistors Q5 and Q6 in response to a signal based on the operation of the switch SW1 or a signal from the comparator CMP1. The transistors Q5 and Q6 are connected in series. The collector of the source transistor Q5 is connected to a terminal at a potential VP, and the emitter thereof is connected to the gate terminal TG through the resistor RG. The collector of the synchronous transistor Q6 is connected to the gate terminal TG through the resistor RG, while the emitter thereof is connected to ground potential (GND). The terminal at potential VP is connected to the charge pump circuit 305, and by the output of the charge pump circuit 305 the potential VP of this terminal is set to a voltage higher than that at the power supply 101, e.g., 12V+10V if the voltage at the power supply 101 is 12V.

The drive circuit 111 serves as a driving device in which, when the switch SW1 is thrown and the input terminal T10 is grounded through the switch SW1, the source transistor Q5 is turned on in response to a command signal from the input terminal T10, thereby outputting a high-level drive signal (on-pulse signal) to the output terminal (the point of contact between the transistor Q5 and the transistor Q6). Meanwhile, when the switch SW1 is opened, since the voltage from the power supply 101 is applied to the input terminal T10 through the resistor R11, the synchronous transistor Q6 is turned on, thereby shifting the level of the output terminal (the point of contact between the transistor Q5 and the transistor Q6) to a low level. Incidentally, the drive circuit 111 may be configured by using a CMOSFET instead of a bipolar transistor.

Figure 3A:
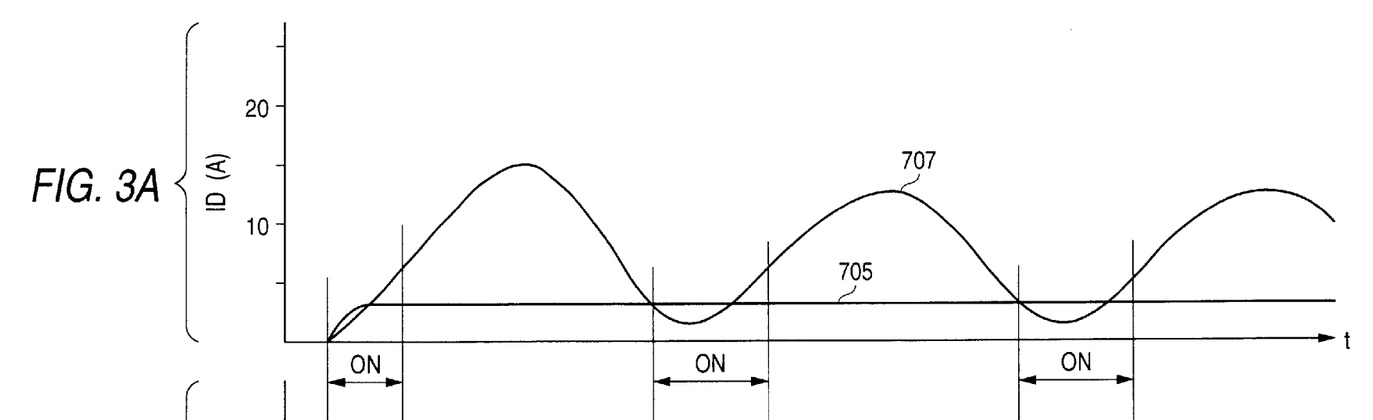
FIGS. 3A and 3B are waveform diagrams for explaining the operation of the switching device shown in FIG. 1.
Figure 3B:
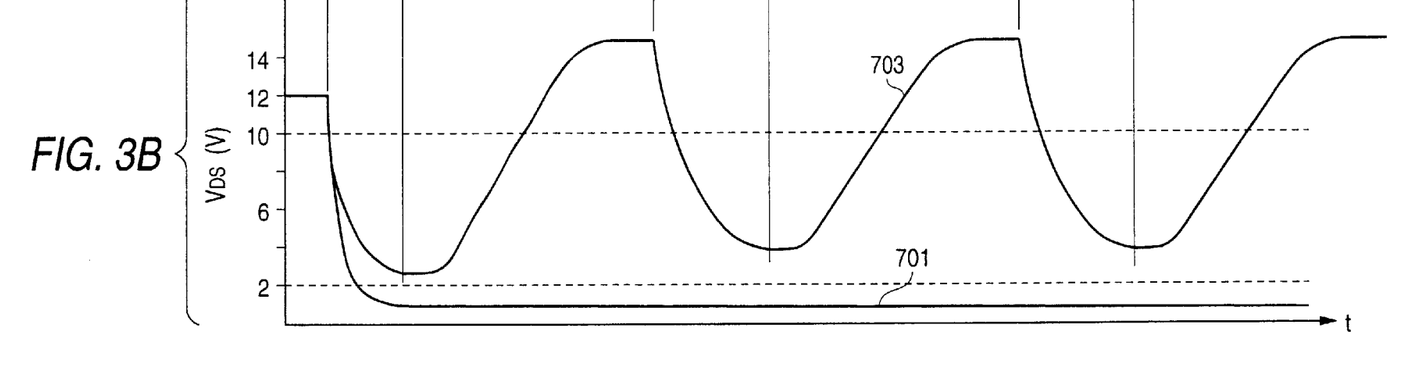

When the drive signal (on-pulse signal) from the drive circuit 111 having the above-described configuration is inputted to the gate terminal TG, the FETs QA, QB, and QC conduct, and a voltage 701 between the drain and source electrodes of each FET drops to 2V or less, as shown in FIG. 3B. At this time, when the load 102 is in a normal state, the voltage between the drain and source electrodes of each FET is maintained at 2V or less while the drive signal is being outputted from the drive circuit 111, and a drain current 705 at the FET QA is constantly fixed.

Here, if the load 102 or the like becomes short-circuited, a large current flows across the load 102 or the like, so that there is a possibility of the load 102 and the FET QA becoming damaged.

Accordingly, an arrangement is adopted in which the source voltages at the FETs QA and QB are monitored by the comparator CMP1, and drive circuit 111 is forcibly stopped from outputting the drive signal when the two voltages have been in an abnormal condition.

Namely, the source voltage from the FET QA is applied to the plus input terminal of the comparator CMP1, while the source voltage from the FET QB is applied to its minus input terminal. The comparator CMP1 having a hysteresis characteristic compares the voltages inputted to its plus input terminal and minus input terminal, and outputs the "H" level output signal when the source voltage at the FET QA is substantially equal to or higher than the source voltage at the FET QB, whereas, when the source voltage at the FET QA has been out of a tolerance by the reference voltage (the source voltage at the FET QB), i.e., when a current larger than normal has flowed across the load 102 and the source voltage at the FET QA has become lower than the reference voltage due to the first reference resistor Rr1, then the comparator CMP1 outputs the "L" level output signal to the drive circuit 111 by assuming that an abnormal current has flowed across the FET QA. When the "H" level signal is being inputted from the comparator CMP1, the drive circuit 111 is able to output the drive signal; however, when the "L" level signal is inputted, the drive circuit 111 is forcibly stopped from outputting the drive signal. Thus, the comparator CMP1 serves as a drive stopping device for forcibly stopping the drive circuit 111 from outputting the drive signal.

As for the comparator CMP2 as well, the source voltage from the FET QA is inputted to its plus input terminal, while the source voltage from the FET QC is inputted to its minus input terminal. The comparator CMP2 compares the voltages inputted to its plus input terminal and minus input terminal, and outputs the "L" level output signal when the source voltage at the FET QA is substantially equal to or lower than the source voltage at the FET QC, whereas, when the source voltage at the FET QA is out of a tolerance by the reference voltage (the source voltage at the FET QC) for the undercurrent determination, e.g., when a current extremely smaller than normal has flowed due to the disconnection of the load 102, and when the source voltage at the FET QA has become higher than the reference voltage for the undercurrent determination, then the comparator CMP2 outputs the "H" level output signal to the drive circuit 111 by assuming that an abnormal current has flowed across the FET QA. Thus, the comparator CMP2 serves as an abnormality determining device for outputting a determination result concerning presence or absence of the abnormality to the abnormality detecting unit 501.

On the other hand, when the FET QA shifts from the on state to the off state, the transistor Q6 is turned on, causing a diode D1 to conduct. As a result, a current flows in the path of the resistor R1 and the diode D1, so that the potential at the plus input terminal of the comparator CMP1 drops to a level lower than when the drive circuit 111 is performing on-control. Accordingly, the FET QA is maintained in the off state immediately after the shift to the off state until a predetermined small difference arises in the drain-source voltage, i.e., until the source voltage at the FET QA becomes substantially equal to the source voltage at the FET QB.

However, even in the case where the FET QA is set in the off state due to such as a shortcircuiting of the wiring, the drain current increases, and the FET QA shifts to the off state after going through a pinchoff region, e.g., after undergoing the operational state in a triode characteristic region. Consequently, the potential at the plus input terminal of the comparator CMP1 becomes high after the lapse of a fixed time, so that the output level of the comparator CMP1 changes from the "L" level to the "H" level, causing the FET QA to shift to the on state again. As shown in FIG. 3B, such a periodic transition of a drain-source voltage 703 at the FET QA during the occurrence of an abnormality due to such as the shortcircuiting of the load 102 continues while the switch SW1 is being closed, with the result that a drain current 707 at the FET QA periodically changes. The period of the transition of the drain-source voltage 703 at the FET QA is determined by a time constant based on such as the inductance of the wiring, the wiring resistance, and the capacitor capacity of the FET QA.

Accordingly, the number of times the FET QA is turned on and off is counted, and when this discrete value has reached a set value, the FET QA is forcibly cut off, and this cut-off state is held.

Specifically, the on/off counter circuit 304 and the cutoff latch circuit 306 are provided as circuits for counting the on-off state of the FET QA (see Unexamined Japanese Patent Publication No. Hei. 6-244414).

As shown in FIG. 2, the on/off counter circuit 304 comprises bipolar transistors Q41, Q42, and Q43, an n-channel FET Q44, diodes D41, D42, and D43, a zener diode ZD41, and resistors R41 to R46.

The cathode side of the zener diode ZD41 is connected to the source terminal S of the FET QA, and when the voltage at the source terminal S is in a normal state, a forward bias voltage is applied to the base of the transistor Q43, so that the transistor Q43 is in the on state. For this reason, the transistor Q42 is also in the on state. Meanwhile, since the transistor Q41 has its base connected to the output terminal of the drive circuit 111 through the resistor R41 and the diode D42, when the transistor Q5 is on, i.e., when the FET QA is on, the transistor Q41 is in the off state.

On the other hand, when the transistor Q6 is turned on, i.e., when the FET QA is turned off, since the diode D42 is grounded through the transistor Q6, the transistor Q41 is turned on. If the transistor Q41 is turned on, the current from the power supply 101 flows to the capacitor C12 through the transistors Q41 and Q42 and the resistor R44, so that the capacitor C12 is charged.

Next, when the transistor Q5 shifts from the off state to the on state, the transistor Q41 is turned off, and the charge built up in the capacitor C12 is discharged through the resistor R46. Subsequently, when the transistor Q6 is turned on again, and the transistor Q41 is turned on, the capacitor C12 is further charged.

In such a process in which the on-off action is repeated, if the gate voltage at the FET Q44 exceeds a threshold level due to the charge built up in the capacitor C12, the FET Q44 is turned on, causing the diode D42 to conduct. Consequently, both ends of a temperature sensor 121 are shortcircuited through the diode D43, and a latch command signal is outputted to the cutoff latch circuit 306. Namely, the on/off counter circuit 304 serves as a latch commanding device. Incidentally, the time period until the frequency of on-off action reaches a set value can be adjusted by a time constant based on the resistor R46 and the capacitor C12.

The cutoff latch circuit 306 comprises n-channel FETs QS, Q11, Q12, Q13, and Q14, the temperature sensor 121, and resistors R31 to R35, and the FET QS has its drain electrode connected to the gate terminal TG of the FET QA and its source electrode connected to the source terminal S of the FET QA. The temperature sensor 121 includes four diodes connected in series, and is arranged such that when the temperature of the semiconductor chip 110 has exceeded a set temperature, the voltage at its both ends becomes lower than a set voltage. Namely, at normal times, the voltage at both ends of the temperature sensor 121 is set to be higher than the threshold level of the voltage between the source and gate electrodes of the FET Q11, and the FET Q11 is maintained in a normally on state. Then, when the FET Q11 is on, the FET Q14 is maintained in the off state, the FET Q13 is maintained in the on state, and the FETs Q12 and QS are maintained in the off state.

Meanwhile, when the FET Q44 is turned on and both ends of the temperature sensor 121 are shortcircuited through the diode D43, or the temperature of the semiconductor chip 110 has exceeded a set temperature and the voltage at both ends of the temperature sensor 121 has dropped to a level below a set voltage, the FET Q11 shifts from the on state to the off state, and the FET Q14 is turned on. If the FET Q14 is turned on, the FET Q13 is turned on and the FET QS is also turned on, with the result that the source and gate electrodes of the FET QA are shortcircuited by the FET QS, and the FET QA is set in the cutoff state. This shortcircuited state is latched by the FETs Q12 and Q13 serving as the latch circuit. Namely, the cutoff latch circuit 306 serves as a cutoff latch device which sets the FET QA in a nonconducting state and latches this nonconducting state when the frequency of the on-off action counted by the on/off counting circuit 304 has reached a set value, or when the temperature of the semiconductor chip 110 detected by the temperature sensor 121 has exceeded a set temperature.

An embodiment of the present invention will be described with reference to FIG. 4.

Figure 4:
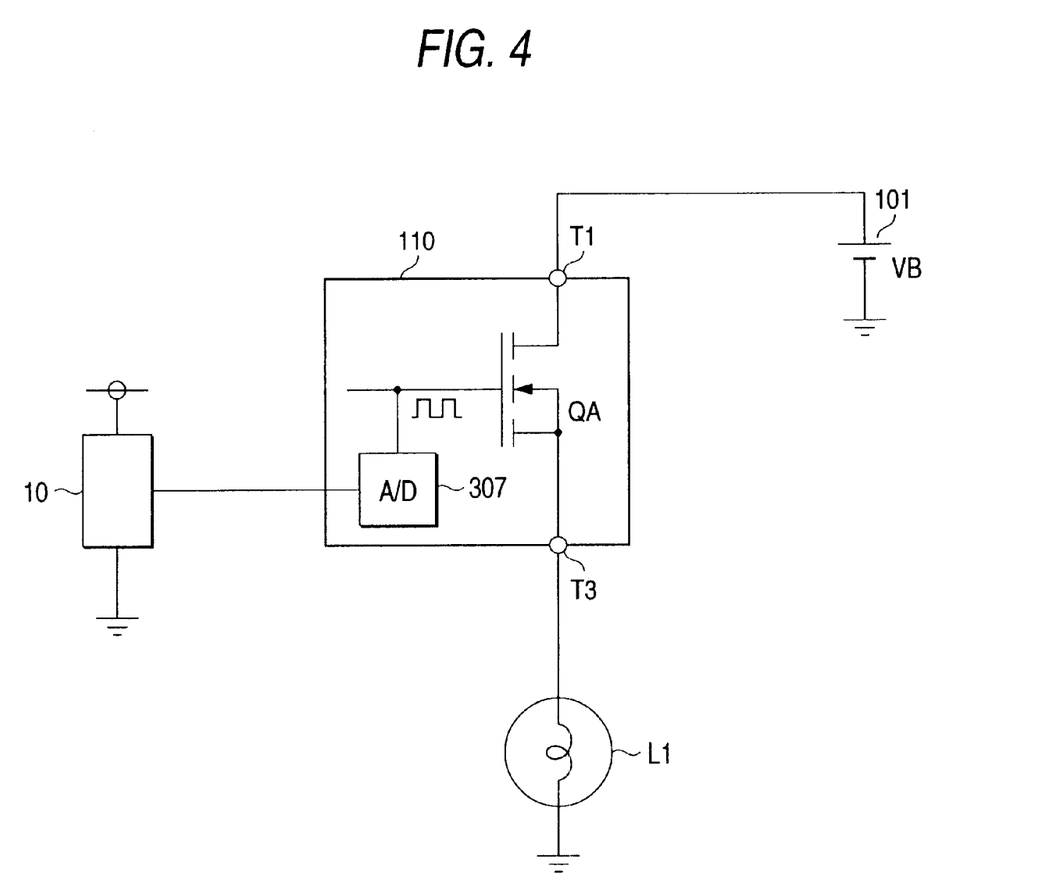
FIG. 4 is a circuit diagram showing a major portion of an auto light-control system which forms an embodiment of the present invention.

FIG. 4 is a circuit diagram showing a major portion of an auto light-control system which forms an embodiment of the present invention. In FIG. 4, an A/D converting circuit 307 as analog-to-digital converting device is integrated into the semiconductor chip 110. A light sensor 10 is connected to the input side of the A/D converting circuit 307, and an output signal of the comparator CMP1 is connected to the control terminal of the A/D converting circuit 307. A head light L1 as a load is connected to the output terminal T3 of the semiconductor chip 110.

The light sensor 10 is designed such that it senses an ambient brightness and produces an analog signal having a signal level which corresponds to the ambient brightness to the A/D converting circuit 307. The A/D converting circuit 307 converts the analog signal received from the light sensor 10 into a digital signal having a pulse width corresponding to a signal level of the analog signal. This digital signal is input to the gate terminals of the FETs QA and QB. Thus, a PWM signal of which the pulse width depends on the ambient brightness is applied as a drive signal to the gate terminal of the FET QA. The FET QA is on/off controlled by the PWM signal output from the A/D converting circuit 307, and it on/off controls the head light L1 in accordance with the PWM signal, whereby an average current flowing into the head light L1 is controlled.

In the thus constructed auto light-control system, when an ambient brightness is high, the output signal level of the light sensor 10 is low, so that no output signal is produced from the A/D converting circuit 307 and the head light L1 is in a turned-off state.

When the ambient brightness becomes gradually dark, the output signal level of the light sensor 10 increases, so that the A/D converting circuit 307 produces a PWM signal of which the pulse width depends on the output signal level of the light sensor 10. The PWM signal is input to the gate terminals of the FETs QA and QB, those FETs are on/off controlled in accordance with the PWM signal, and an average value of the current flowing through the head light L1 is controlled in accordance with the pulse width of the PWM signal. Thus, the brightness of the head light L1 is automatically adjusted in accordance with an ambient brightness.

In the present embodiment, the FET QA is inserted in the power supply circuit connecting the power supply 101 and the head light L1, and the FET QA is controlled in accordance with an output signal of the A/D converting circuit 307. Therefore, the embodiment can control a brightness of the head light L1 in accordance with an ambient brightness by using a simple circuit arrangement, not using a control system including a CPU. In this respect, the present invention contributes to simplification of the circuit arrangement.

Also in the embodiment, an operating state of the FET QA is monitored by use of the FETs QA and QB, and the first reference resistor Rr1, which are fabricated into the semiconductor chip 110. Therefore, a stable control of the FET QA is secured.

When the head light L1 is short circuited, for example, and the load is abnormal, a signal from the comparator CMP1 forcibly stops the drive by the A/D converting circuit 307. At this time, the FET QA is latched to a non-conductive state. Damaging of the FET QA by the load short-circuiting is prevented.

While in the above-mentioned embodiment, the load was the head light L1, the head light may be any of other types of load, for example, the clear lamp. A heater, a defroster, or the like may be used in place of the head light. In this case, if the a thermistor is used for the thermo-sensitive element, the output of the heater, the defroster or the like may be controlled in accordance with ambient temperature.

In the thus constructed auto light-control system, an output signal of the light sensor is applied through the analog-to-digital converting device to the first switching device, whereby the first switching device is always on/off controlled. In this way, a brightness of the light as the load is controlled in accordance with an ambient brightness. Accordingly, a brightness of the load, e.g., the lighting device, can be controlled in accordance with an ambient brightness using a simple circuit arrangement, not using the CPU.

What is claimed is:

1. An auto light-control system, comprising:
    a light sensor which senses an ambient brightness, and produces an analog signal representative of the ambient brightness;
    an analog-to-digital converting device which converts the analog signal output from the light sensor into a digital signal with a pulse width corresponding to a signal level of the analog signal, and outputs the digital signal as a drive signal;
    a first switching device which is inserted in a power supply circuit connecting a load and a power supply, and which is adapted to conduct in response to the drive signal to close the power source circuit;
    a reference resistor which receives a current from the power supply to generate a reference voltage; and
    a second switching device which is inserted in a shunt circuit connecting the power supply and the reference resistor, and which is adapted to conduct in response to the drive signal to close the shunt circuit.

2. The auto light-control system of claim 1, further comprising:

a drive stopping device which stops the analog-to-digital converting device from outputting the drive signal when an output voltage of the first switching device is compared with the reference voltage and a difference between the output voltage and the reference voltage is out of a tolerance.

* * * * *